Patented Feb. 12, 1952

2,585,583

UNITED STATES PATENT OFFICE 2,585,583

HYDROGENATED BUTADIENE-ACRYLO-NITRILE COPOLYMER

Paul Swithin Pinkney, Wilmington, Del., assignor to E. I. du Pont de Nemours & Company, Wilmington, Del., a corporation of Delaware No Drawing. Application August 1, 1949, Serial No. 108,043

5 Claims. (Cl. 260—83.3)

This invention relates to new polymeric materials and more particularly to a new class of polymeric amines.

This application is a continuation-in-part of my copending application Serial Number 51,845, filed September 29, 1948, and now abandoned.

Polymeric materials containing amino groups are assuming increasing importance in several technical applications, such as in the treatment of textiles as dyeing assistants, detergents, etc. However, the choice of amine resins suitable for various uses is rather limited. Few resins which contain primary amino groups and which are useful generally in the coating and impregnating arts are known, and fewer still can be obtained from available and economical materials. In particular, it has recently been discovered (application Serial Number 18,709, filed by M. E. Cupery on April 2, 1948, now Patent No. 2,526,637 issued October 24, 1950) that certain amino resins are capable of shrinkproofing wool when applied thereto in conjunction with formaldehyde. This is a highly important application from the technical standpoint, but very few amino resins having this property can be obtained from available and economical starting materials.

This invention has as an object a new class of amino resins which contain primary amino groups and which are useful in the above-mentioned and in other valuable technical applications. Another object is a specific class of amino resins which show outstanding shrinkproofing effects when applied to wool in conjunction with formaldehyde. A further object is a method for obtaining these resins. Other objects will appear hereinafter.

These objects are accomplished by the invention of polymers containing primary amino groups and characterized by solubility in dilute aqueous acids, which polymers are the hydrogenation products of copolymers of 1,3-butadiene with acrylonitrile or methacrylonitrile containing from about 67% to about 84% of butadiene by weight.

The polymeric amines described herein contain a plurality of aminomethyl groups attached as lateral substituents through the methylene radical to a polymeric, linear, aliphatic hydrocarbon chain. More specifically these polymeric amines are linear polymers characterized by a plurality of units of the formula

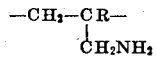

wherein R is hydrogen or methyl, these units being interspersed with completely or partially hydrogenated butadiene units. These polymeric amines are prepared by hydrogenation in substantially anhydrous liquid phase, preferably catalytic hydrogenation and preferably in the presence of ammonia, of a copolymer of 1,3-butadiene with acrylonitrile or alpha-methacrylonitrile, said copolymer containing from about 67% to about 84% of butadiene by weight, until part at least of the nitrile groups are converted to amino-methyl groups.

The molecular weight of these polyamines is in general above 500 and preferably above 1000. It may be as high as 100,000 or even more, although the most useful polymers have molecular weights between 1000 and 10,000. The amino polymers of this invention vary in appearance from viscous liquids to resinous, high softening solids, depending chiefly upon the starting material and upon the extent of hydrogenation. They are in general soluble in organic solvents such as aromatic hydrocarbons, long chain aliphatic hydrocarbons and long chain alcohols. They are characterized by solubility in dilute aqueous acids, as exemplified by acetic acid of 1–10% concentration.

The starting materials for the preparation of polymeric primary amines suitable for use in the shrinkproofing of wool are the copolymers of 1,3-butadiene with acrylonitrile or alpha-methacrylonitrile, wherein the butadiene content is between 67% and 84% by weight. It has been found that polymers which depart appreciably from the above-specified compositions lead, on hydrogenation, to polymeric amines which are not soluble in dilute acid and which are unsatisfactory for wool shrinkproofing. The reason for this unexpected criticality of polymers within a narrow range of butadiene content is not known. The best results as regards wool shrinkproofing are obtained with polymeric amines derived by hydrogenation from butadiene/acrylonitrile copolymers having between 73% and 81% of butadiene by weight, i. e., a butadiene/acrylonitrile mole ratio between about 2.6:1 and 4.2:1.

The composition discussed above for the starting materials corresponds to between about 10 and 30 carbon atoms in the linear polymeric hydrocarbon chain for each side chain cyano group. Preferably, the starting polymers have between about 14 and 25 carbon atoms in the linear polymeric chain for each cyano group. Hydrogenation of the cyano groups to aminomethyl groups is usually incomplete. Depending on the starting material and the hydrogenation conditions, the proportion of cyano groups reduced to aminomethyl groups may vary from 25% to 95%. In any event, it is necessary, in order that satisfactory wool shrinkproofing properties be achieved, that the amino polymer contain between about 1.5% and about 8.5% by weight of nitrogen in the form of primary amino nitrogen. Preferably, it contains between 3% and 6% of primary amino nitrogen.

The molecular weight of the butadiene/acrylonitrile or butadiene/methacrylonitrile copolymers should desirably not exceed 100,000, since very high molecular weight polymers are difficult to hydrogenate in clear-cut fashion. Preferably, the starting polymers have molecular weights between 1000 and 10,000. They may be prepared by any of the procedures known in the art. Very satisfactory results are obtained by using as polymerization initiator one of the azonitriles described in U. S. Patent 2,471,959, although other more conventional catalysts such as the organic peroxides are suitable. The molecular weight may be controlled within the preferred range by the use of a chain transfer agent such as isopropyl alcohol.

The catalytic hydrogenation of the polymer containing acrylonitrile or alpha-methacrylonitrile units is carried out in the liquid phase, that is, the polymer is either above its melting point or is dissolved in an organic solvent. The catalyst may be any of the metals or metallic compounds known to promote hydrogenation of nitriles, for example, platinum or ruthenium. A preferred catalyst is the specially prepared nickel known as Raney nickel, or the alloy skeleton cobalt described in U. S. Patent 2,257,800. Another preferred class of catalysts comprises the metal chromites disclosed in U. S. Patent 2,137,407, examples of which are copper chromite, as such or on a support such as kieselguhr, copper-barium chromite, cobalt chromite, nickel chromite and the like. The starting polymer contains unsaturation and it is often desirable to carry out the hydrogenation in two steps, whereby the carbon-to-carbon double bonds are first reduced, followed by reduction of the carbon-to-nitrogen bond. This procedure avoids tendency to gelation of the hydrogenated polymers which may occur if the reduction is carried out in one step. In the first step a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature.

Hydrogenation of the cyano groups will proceed at temperatures as low as 100° C. and even somewhat lower with the most active catalysts. In most cases, however, it is preferable to employ temperatures of at least 150° C. The temperature may be as high as can be safely used, for example, up to 350° C., the most useful range being between 200 and 275° C. A hydrogen pressure above about 500 lb./sq. in. is desirable. The pressure can be as high as the equipment will stand, a suitable range being between 1000 and 30,000 lb./sq. in. The hydrogenation is continued until enough cyano groups are reduced to give, as mentioned above, a polymer containing at least 1.5% of primary amino nitrogen.

The choice of a liquid medium for the hydrogenation, when such a medium is used, is not critical. It is only necessary that the medium have adequate solvent power for the nitrile polymer to be hydrogenated and the resulting polyamines, e. g., that these polymers be soluble to the extent of at least 5% by weight in the solvent. The solvent should of course be one which is stable at the hydrogenation temperature and substantially unreactive with ammonia and amines. Suitable solvents include, for example, tetrahydronaphthalene, decahydronaphthalene, benzene, toluene, the xylenes, cyclohexane, tetrahydrofuran, di-n-butyl ether, tetramethylene cyclic sulfone, dioxan and the like. The preferred solvents are the aromatic and alicyclic hydrocarbons and the alicyclic ethers. The quantity of solvent used is immaterial as long as there is enough of it to keep the polymeric materials in solution. The reaction medium should be substantially anhydrous, i. e., it should not contain more than about 5% of water by weight, in order to prevent the competitive hydrolytic reaction affecting the cyano groups before they can be hydrogenated.

It is preferable, although not essential, to have ammonia or an aliphatic amine present in the hydrogenation mixture for the purpose of repressing formation of secondary amines by reaction between the amino and cyano groups. The quantity of ammonia may vary considerably, but it is preferable to use at least one mole of ammonia per acrylonitrile or alkacrylonitrile unit. Ammonia can be used in very large excess if desired.

Catalytic hydrogenation is the preferred procedure, but the butadiene/nitrile copolymers may also be hydrogenated by noncatalytic methods, e. g., by treatment with an alkali metal such as sodium or potassium and a low molecular weight aliphatic alcohol such as methanol, ethanol, butanol and the like. This method is illustrated in Example VI below.

The invention is illustrated in greater detail in the following examples, in which parts are by weight.

*Example I*

A butadiene/acrylonitrile copolymer was prepared as follows. A stainless steel-lined pressure vessel was charged with 80 parts of isopropyl alcohol, 21 parts of acrylonitrile and 6 parts of alpha,alpha' - azodiisobutyronitrile. The vessel was cooled in a carbon dioxide-acetone bath, air was evacuated from it, and 129 parts of 1,3-butadiene was distilled into it. The vessel was closed and heated at 80° C. with agitation for 10 hours. The solvent and unreacted monomer were removed by distillation under reduced pressure, leaving 67 parts of a clear, viscous liquid. The butadiene/acrylonitrile copolymer contained 5.92% of nitrogen, corresponding to 22.4% by weight of acrylonitrile and 77.6% of butadiene, or a butadiene : acrylonitrile mole ratio of 3.39:1. This polymer had a relative viscosity of 1.076 in benzene at 25° C. and at a concentration of 0.5 g. per 100 ml. of solution.

This polymer was hydrogenated in two stages as follows. A solution of 50 parts of the polymer in 67 parts of decahydronaphthalene was heated for 2 hours at 75° C. with 3 parts of palladium-on-carbon catalyst under hydrogen at a total pressure of 1000–2000 lbs./sq. in. The mixture was filtered to remove the catalyst and heated to 210° C. under 10 mm. pressure to remove the solvent. There was obtained 34 parts of a viscous oil having an iodine number of 128 and containing 0.8% of primary amino nitrogen.

Thirty parts of this partially hydrogenated polymer was dissolved in 90 parts of decahydronaphthalene and this solution, together with 3 parts of Raney nickel and 50 parts of anhydrous ammonia, was heated in an oscillating autoclave for 19 hours at 250° C. and a hydrogen pressure sufficient to give a total pressure of 930-950 atmospheres in the system. The reaction mixture was filtered to remove the catalyst and heated at 200° C. under 1 mm. pressure to remove the solvent. There was obtained 22 parts of a highly viscous liquid soluble in 5% aqueous acetic acid. This amino polymer contained 5.60% of total nitrogen and 4.09% of primary amino nitrogen, indicating that about 73% of the cyano groups had been reduced to aminomethyl groups. The carbon content was 81.00% and the hydrogen content 13.03%. The polymer had a molecular weight of 1100, as determined by ebullioscopy in benzene.

Example II

A butadiene/acrylonitrile copolymer was prepared by the procedure of Example I. The polymer contained 5.95% of nitrogen, corresponding to 22.6% of acrylonitrile and 77.4% of butadiene by weight or a butadiene : acrylonitrile mole ratio of 3.37:1. Its iodine number was 338 and its molecular weight was 1330, as determined ebullioscopically in benzene.

This polymer was hydrogenated in two stages as follows. A solution of 113 parts of the polymer in 90 parts of decahydronaphthalene was heated for 3 hours at 75-100° C. under hydrogen at a total pressure of 1500-2000 lbs./sq. in. in the presence of 6 parts of a palladium-on-carbon catalyst. The catalyst was then filtered off and rinsed with decahydronaphthalene, the filtrate and washings combined amounting to 225 parts.

A mixture of 112.5 parts of the above decahydronaphthalene solution, 3 parts of Raney nickel and 30 parts of anhydrous ammonia was heated for 6 hours at 200-210° C. under hydrogen at 2500-3200 lbs./sq. in. total pressure. The catalyst was filtered off and the solvent removed under reduced pressure. There was obtained 28.5 parts of amino polymer, a highly viscous liquid partly soluble in 5% aqueous acetic acid. It contained 5.68% of total nitrogen and 1.84% of primary amino nitrogen.

Example III

A stainless steel pressure vessel was charged in an atmosphere of nitrogen with 67 parts of methacrylonitrile, 273 parts of 1,3-butadiene, 250 parts of isopropyl alcohol and 6.7 parts of alpha,alpha' - azodiisobutyronitrile. The vessel was closed and heated with agitation for 16 hours at 90±2° C. It was then cooled to room temperature and the residual butadiene was vented off. Evaporation of the solvent under reduced pressure left 125 parts of a viscous, light yellow butadiene/methacrylonitrile copolymer, having a molecular weight of 1200 as determined by ebullioscopy in benzene.

Forty parts of the above polymer in 160 parts of dioxane was hydrogenated in the presence of 12 parts of cobalt alloy skeleton catalyst (U. S. Patent 2,257,800) and 40 parts of anhydrous ammonia for 15 hours at 250° C. and a total pressure of 900-930 atmospheres. After filtering off the catalyst and removing the solvent under reduced pressure there was left 40 parts of a nearly colorless, viscous polymeric amine soluble in 5% acetic acid. This polymer contained 6.18% of primary amino nitrogen and its neutralization equivalent was 325.

Example IV

A mixture of 250 parts of isopropyl alcohol, 53 parts of acrylonitrile, 220 parts of 1,3-butadiene and 8.1 parts of alpha,alpha'-azodiisobutyronitrile was heated at 90° C. in a stainless steel pressure vessel under an atmosphere of nitrogen for 16 hours. Distillation of the solvent under reduced pressure gave 150 parts of a clear, viscous butadiene/acrylonitrile copolymer having an iodine number of 271 and containing 5.55% nitrogen. This corresponds to 21% acrylonitrile and 79% butadiene by weight or a butadiene : acrylonitrile mole ratio of 3.68:1.

This polymer was hydrogenated in one stage as follows: A solution of 30 parts of the polymer in dioxane was placed in a stainless steel autoclave with 12 parts of a nickel-on-kieselguhr catalyst containing 35% nickel, 3 parts of ruthenium oxide and 30 parts of anhydrous ammonia. The autoclave waas agitated at 100° C. under hydrogen at 560-580 atmospheres' total pressure for 4 hours and at 220° C. under 900 atmospheres' total pressure for 8 hours. After removal of the catalyst, the solvent was evaporated, leaving 20 parts of a clear, colorless, viscous polymeric amine which was soluble in 5% acetic acid to give a solution which foamed strongly on shaking. The polymer contained 5.97% total nitrogen and 5.51% primary amino nitrogen.

Example V

A commercial acrylonitrile/butadiene copolymer containing 26% by weight of acrylonitrile and 74% of butadiene was milled at 45° C. for one hour to reduce its molecular weight. It had then a relative viscosity in toluene at 25° C. of 1.206 (0.2 g. in 100 ml. of solution); 1.458 (0.4 g. in 100 ml. of solution); and 1.752 (0.6 g. in 100 ml. of solution). From these values, the molecular weight of the polymer was calculated to be 94,000, using the relationship $[\eta]=5.0\times10^{-4}M^{0.66}$, which is that found valid for styrene/butadiene copolymers.

A solution of 40 parts of this polymer in 160 parts of dioxane, together with 4 parts of palladium-on-charcoal (10% palladium), 16 parts of nickel-on-kieselguhr (35% nickel) and 30 parts of anhydrous ammonia was hydrogenated at 150° C. under 495 atmospheres' total pressure for 2 hours, then at 275° C. and 900-960 atmospheres' total pressure for 10 hours. At the conclusion of this experiment the polymer had precipitated out and was mixed with the catalyst. The reaction mass was tumbled for 16 hours with a mixture of equal volumes of dioxane and acetic acid, which dissolved the hydrogenated polymer. The catalyst was filtered off and the solvent was evaporated leaving 17 parts of polymeric amine as a dark, viscous mass soluble in 5% aqueous acetic acid. This material contained 6.20% total nitrogen and 5.21% primary amino nitrogen.

Example VI

A butadiene/acrylonitrile copolymer was prepared from 5 moles of 1,3-butadiene and 1 mole of acrylonitrile. This polymer which contained 5.14% nitrogen, contained 34% by weight of the monomeric cyclohexenenitrile formed by simple addition of acrylonitrile to butadiene. A solution of 50 parts of this polymer in a mixture of 120 parts of toluene and 66.7 parts of tertiary butyl alcohol was treated portionwise at 85° and while stirring vigorously with 51.4 parts of a 50% by weight dispersion of sodium in toluene, to which had been added an additional 76 parts of toluene to make it more fluid. The reaction mixture increased in viscosity during the run, making it necessary to add more toluene (109 parts) to maintain efficient stirring.

At the end of the reaction, the mixture was run slowly into a hot mixture of equal volumes of tertiary butyl alcohol and toluene saturated with steam, while adding water gradually. This destroyed any remaining sodium. The organic layer was then separated and washed with water, then the solvent was removed by distillation, in the course of which xylene was added twice to facilitate removal of the remaining water. During these operations the monomeric cyclohexenenitrile present in the initial polymer was also removed either as such or as water-soluble hydrogenation or hydrolysis products. The final product (27 parts) was a viscous, light amber polymeric amine soluble in 5% aqueous acetic acid. It contained 5.02% total nitrogen and 3.15% primary amino nitrogen and it had an iodine number of 272, indicating no appreciable change in chain unsaturation from the original material.

A less highly unsaturated polymeric amine was prepared by hydrogenating 10 parts of the polymeric amine just described in 100 parts of dioxane, with 2 parts of a palladium-on-charcoal catalyst containing 10% of palladium and 4 parts of alloy skeleton nickel, at 120° C. and 1500 lbs./sq. in. pressure for 2½ hours. After filtering off the catalyst and removing the solvent, there was obtained a viscous oil lighter in color than the starting material, containing 5.16% total nitrogen and 4.30% primary amino nitrogen and having an iodine number of 124.

*Example VII*

A mixture of 300 parts of cyclohexane, 66 parts of acrylonitrile, 281 parts of 1,3-butadiene, and 6.7 parts of alpha,alpha'-azodiisobutyronitrile was heated in a pressure vessel at 70° C. for a total of 16 hours. Removal of unreacted monomers, solvent, and small amounts of byproduct left 142 parts of a light yellow viscous liquid which contained 6.17% nitrogen and had an iodine number of 325 and a molecular weight of 2120. This polymer contained 23.3% of acrylonitrile and 76.7% of butadiene by weight.

A mixture of 40 parts of this polymer, 160 parts of cyclohexane, 10 parts of nickel-on-kieselguhr catalyst (35% nickel), 2 parts of 10% palladium-on-charcoal catalyst and 25 parts of anhydrous ammonia was placed in an oscillating pressure vessel and hydrogenated at 120° C. under 200 atmospheres' pressure for 4 hours and 275° C. under 600 atmospheres' pressure for 12 hours. Removal of the catalyst by filtration and solvent by vacuum distillation left 30 parts of a light yellow viscous liquid which was readily soluble in 2% acetic acid. The product had a neutralization equivalent of 265, an iodine number of 55.1, and contained 5.52% primary amino nitrogen.

*Example VIII*

A butadiene/acrylonitrile copolymer was prepared as in the preceding example except that benzene was used as the solvent in place of cyclohexane. The product had an iodine number of 291, a molecular weight of 1350 and contained 6.86% nitrogen, indicating a content of 26% acrylonitrile and 74% butadiene by weight.

For hydrogenation, 50 parts of this polymer was dissolved in a mixture of 75 parts of benzene and 75 parts of cyclohexane. The catalyst consisted of 20 parts of nickel-on-kieselguhr which had been pretreated with 5% sodium hydroxide solution, and 5 parts of 5% palladium-on-alumina. Twenty parts of liquid ammonia was added and the mixture was hydrogenated in an oscillating pressure vessel at 275° C. under a total pressure of 400 atmospheres for 12 hours. Removal of the catalyst and solvent as above left a light amber viscous liquid, readily soluble in 2% acetic acid. This product contained 4.79% primary amino nitrogen and had a neutralization equivalent of 311 and an iodine number of 47.

*Example IX*

A mixture of 212 parts of acrylonitrile, 1300 parts of benzene, 19.4 parts of alpha,alpha'-azodiisobutyronitrile and 1080 parts of 1,3-butadiene was heated in a stirred pressure vessel at 65° C. for 15 hours. Removal of unreacted monomer, solvent, and monomeric by-products left 333 parts of a light amber viscous syrup which contained 6.62% nitrogen and had an iodine number of 311 and a molecular weight of 751. This polymer contained 25% of acrylonitrile and 75% of butadiene by weight.

A mixture of 50 parts of this polymer, 150 parts of benzene, 15 parts of barium-promoted copper chromite (see Organic Syntheses, Collective Volume II, p. 142), and 25 parts of anhydrous ammonia was placed in an oscillating autoclave and hydrogenated at 280° C. under a pressure of 250–300 atmospheres for 16 hours. Removal of the catalyst and solvent together with some insoluble gelled polymer left 15 parts of a dark red viscous syrup, soluble in 2% acetic acid. This product contained 6.58% total nitrogen and 3.14% primary amino nitrogen. It had an iodine number of 145, a neutralization equivalent of 412 and a molecular weight of 1205.

A cadmium-promoted copper chromite catalyst is equally effective in the hydrogenation of copolymers of butadiene with acrylonitrile or methacrylonitrile.

*Example X*

A butadiene/acrylonitrile copolymer containing 6.48% nitrogen (24.5% acrylonitrile, 75.5% butadiene) and having an iodine number of 320, a bromine number of 242 and a molecular weight of 2030 was hydrogenated as follows: 50 parts of polymer was dissolved in 125 parts of dioxane and this solution was introduced into an oscillating autoclave together with 15 parts of barium-promoted copper chromite catalylst and 20 parts of anhydrous ammonia. The mixture was hydrogenated at 180° C. under a pressure of 940 atmospheres for nine and one-half hours. Removal of the catalyst and solvent left 30 parts of light colored viscous syrup soluble in 2% acetic acid. This polymeric amine contained 5.41% total nitrogen and 3.76% primary amino nitrogen, and had an iodine number of 203, a neutralization equivalent of 402 and a molecular weight of 1915.

*Example XI*

A butadiene/methacrylonitrile copolymer having the following analysis: percent nitrogen 5.63 (27% methacrylonitrile and 73% butadiene);

iodine number 327; bromine number 201; and molecular weight 3190, was hydrogenated as follows:

A mixture of 50 parts of the polymer, 90 parts of dioxane, 15 parts of barium-promoted copper chromite catalyst, and 20 parts of triethylamine was placed in an oscillating autoclave and heated at 260° C. under hydrogen pressure sufficient to give 400 atmospheres total pressure for 8 hours. Removal of the catalyst and solvent left 40 parts of a light colored opaque viscous syrup readily soluble in 2% acetic acid. This polymeric amine had the following analysis: Total nitrogen 5.29%; primary amino nitrogen 4.31%; neutralization equivalent 285; iodine number 112.

*Example XII*

A mixture of 1080 parts of 1,3-butadiene, 335 parts of methacrylonitrile, 1200 parts of decahydronaphthalene, and 28.3 parts of alpha,alpha'-azodiisobutyronitrile was heated at 80° C. for a total of 16 hours. The mixture was discharged from the autoclave and stripped by distilling to a temperature of 65° C. at 10 mm. pressure. The weight of the residue was 1688 parts and analysis showed this residue to contain 50% polymer. The yield of polymer was thus 59%. The polymer had the following analysis: Carbon 83.94%, hydrogen 10.44%, nitrogen 4.49%, molecular weight 940. It contained 21.5% of methacrylonitrile and 78.5% of butadiene by weight.

For hydrogenation, 120 parts of the above solution containing 50% polymer, 80 parts of decahydronaphthalene, 18 parts of nickel-on-kieselguhr, 6 parts of 10% palladium-on-charcoal and 24 parts of anhydrous ammonia was placed in an oscillating autoclave and heated at 120° C. under hydrogen at 400 atmospheres total pressure for 6 hours. Removal of the catalyst and solvent left 48.5 parts of a nearly colorless viscous syrup which was readily soluble in 2% acetic acid. This polymeric amine had the following analysis: Primary amino nitrogen 5.13%; neutralization equivalent 327; iodine number 67; molecular weight 1090.

Instead of the mixed catalysts used in this example, nickel-on-kieselguhr may be used alone with good results. There may also be used a cobalt-on-alumina catalyst, which may be prepared for example by the method described in application Ser. No. 651,980, filed by C. W. Todd on March 4, 1946 and now abandoned.

*Example XIII*

An acrylonitrile/butadiene copolymer was prepared by heating for 16 hours at 80° C. a mixture of 89 parts of acrylonitrile, 243 parts of 1,3-butadiene, 250 parts of benzene and 10 parts of alpha,alpha'-azodiisobutyronitrile. There was obtained 200 parts of a viscous syrup containing 8.2% nitrogen, indicating 31% of acrylonitrile and 69% of butadiene by weight. This polymer had an iodine number of 297 and a molecular weight of 1790.

Hydrogenation was carried out on a solution of 40 parts of this polymer in 160 parts of dioxane, with 4 parts of 10% palladium-on-charcoal, 12 parts of 35% nickel-on-kieselguhr and 40 parts of anhydrous ammonia. This mixture was heated 4 hours at 110° C. under hydrogen at 450 atmospheres total pressure, then 12 hours at 250° C. under 890–975 atmospheres pressure. There was obtained 29 parts of a light colored, somewhat rubbery polymeric amine which was soluble in 5% acetic acid. It contained 4.32% primary amino nitrogen and had a neutralization equivalent of 334.

The polymeric amines of this invention have an unexpected and specific usefulness in the shrinkproofing of wool. For this use, they are applied to wool in dilute acid solution, this treatment being accompanied (simultaneously or separately) by a formaldehyde treatment. For example, a solution of 2.9 parts of the polymeric amine of Example II in 50 parts of water containing 3 parts of acetic acid was applied to wool flannel. After air-drying, the wool retained about 10% of its weight of the polymer. The treated fabric was exposed to formaldehyde vapors for 1 hour, then baked at 100° C. for 20 minutes, rinsed in soapy water and dried. After this treatment the wool fabric had a good hand and showed no discoloration. After being subjected to a hand milling test substantially as described by Chamberlain and Menkart in Journal Soc. Dyers and Colourists, 61, 286 (1945), the fabric showed only 5% shrinkage in area, as compared with over 50% area shrinkage for an untreated control.

In the above described wool shrinkproofing treatment, the polymeric amine and the formaldehyde react to give a condensation product which, after standing in the dry state at temperatures above 20° C. and more rapidly above 80° C., becomes insoluble in dilute acids and in organic solvents. For convenience in handling, it is preferable to prepare a solution of the polymeric amine in dilute aqueous acid, e. g., 1–10% acetic acid, and treat it with formaldehyde, e. g., by addition of aqueous 37% formaldehyde in amounts sufficient to combine with at least half of the primary amino groups (an excess can be used). There is then obtained an aqueous solution of the partial condensation product of the polymeric amine with formaldehyde. Such solutions are extremely stable and can be stored for long periods of time without deterioration. In the preferred shrinkproofing method, wool is impregnated with such a solution, squeezed until a weight increase corresponding to about 10% by weight of the condensation product is reached, dried in air and baked at 80–125° C. until the deposited resin is insoluble in dilute acids or organic solvents, washed and dried again. Wool so treated is outstandingly shrinkproofed and retains its satisfactory hand and color.

As already stated, the proportions of butadiene and acrylonitrile or methacrylonitrile in the starting polymers are highly critical from the standpoint of success or lack of it in wool shrinkproofing. This is shown by the fact that polymers prepared as described above but deviating slightly from the stated range of proportions gave, on catalytic hydrogenation according to the general procedure described, polymeric amines which were insoluble in dilute acid and unsuitable for the treatment of wool. Examples of such materials include a polymeric amine from an acrylonitrile/butadiene copolymer containing 35.5% acrylonitrile and 64.5% butadiene, and a polymeric amine from an acrylonitrile/butadiene copolymer containing 14.5% acrylonitrile and 85.5% butadiene. Larger deviations from the stated range lead, of course, to equally unsatisfactory results. In contrast, polymers such as that of Example IV, on the one hand, containing 79% of butadiene, and that of Example XIII, on the other hand, containing 69% of butadiene, as well as those of all the other examples, lead to polymeric amines which are readily soluble in dilute acids and give excellent results in the shrinkproofing of wool. Other observations indicate that the critical range of proportions in the starting polymers lies between about 67% and about 84% of butadiene by weight.

The polymeric amines of this invention, in addition to serving as valuable shrinkproofing agents for wool when used in conjunction with formaldehyde, are also useful per se as film-forming ingredients in coating compositions; as impregnating agents for absorbent materials such as textiles or paper; as detergents; as dyeing assistants, for example, to fix acid dyes to cellulosic substrates; in corrosion preventive treatments of metals; in scrubbing acidic gases, etc. Their condensation products with formaldehyde are useful as wool shrinkproofing agents, primers and coatings for wood, water repellents for fabrics, pigment dispersants in paint formulations, leather finishing agents, pigment binders for textile printing, etc.

As many apparently widely different embodiments of this invention may be made without departing from the spirit and scope thereof, it is to be understood that this invention is not limited to the specific embodiments thereof except as defined in the appended claims.

I claim:
1. A polymeric amine of molecular weight of from 500 to 100,000 which contains from 1.5% to 8.5% by weight of nitrogen in the form of primary amino nitrogen, which is soluble in aqueous 1%-10% acetic acid, and which is the hydrogenation product of a copolymer of 1,3-butadiene with a substance selected from the group consisting of acrylonitrile and methacrylonitrile, said copolymer having a molecular weight not exceeding 100,000 and containing, on the basis by weight of combined 1,3-butadiene and said substance, from 67% to 84% of combined 1,3-butadiene.

2. The polymeric amine defined in claim 1 in which said copolymer contains from 73% to 81% of combined 1,3-butadiene by weight.

3. The polymeric amine defined in claim 1 which has a molecular weight of from 1000 to 10,000.

4. The polymeric amine defined in claim 3 in which said copolymer contains from 73% to 81% of combined 1,3-butadiene by weight.

5. The polymeric amine defined in claim 1 in which the molecular weight of said polymeric amine is from 1000 to 10,000, in which said polymeric amine contains from 3% to 6% by weight of nitrogen in the form of primary amino nitrogen, and in which said copolymer contains from 73% to 81% of combined 1,3-butadiene.

PAUL SWITHIN PINKNEY.

REFERENCES CITED

The following references are of record in the file of this patent:

UNITED STATES PATENTS

| Number | Name | Date |
|---|---|---|
| 2,456,428 | Parker | Dec. 14, 1948 |